United States Patent [19]

Nakov et al.

[11] 4,062,444

[45] Dec. 13, 1977

[54] APPARATUS FOR CYCLELESS TRANSPORTATION

[75] Inventors: Vesselin Nachev Nakov; Emanuil Hristov Nikolov, both of Sofia, Bulgaria

[73] Assignee: Institute Po Metaloobrabotvashti Machini, Iliensko Chaussee, Bulgaria

[21] Appl. No.: 701,011

[22] Filed: June 30, 1976

[51] Int. Cl.² .............................................. B23Q 7/03

[52] U.S. Cl. .................................... 198/648; 198/725; 198/838

[58] Field of Search ............... 198/648, 725, 726, 793, 198/795, 802, 838, 845

[56] References Cited

U.S. PATENT DOCUMENTS

| | | | |
|---|---|---|---|
| 1,282,379 | 10/1918 | Christensen | 198/845 |
| 1,812,112 | 6/1931 | Morgan | 198/793 |
| 1,851,380 | 3/1932 | Briggs | 198/838 |
| 2,275,244 | 3/1942 | Bee et al. | 198/838 |
| 2,609,086 | 9/1952 | McBride et al. | 198/793 |
| 2,848,102 | 8/1958 | Whitney | 198/793 |
| 3,082,861 | 3/1963 | Kornylak | 198/838 |
| 3,141,544 | 7/1964 | Hansen | 198/795 |
| 3,216,555 | 11/1965 | Schelde | 198/793 |

FOREIGN PATENT DOCUMENTS

| | | | |
|---|---|---|---|
| 1,411,940 | 10/1975 | United Kingdom | 198/845 |
| 937,110 | 9/1963 | United Kingdom | 198/838 |

*Primary Examiner*—John J. Love
*Assistant Examiner*—Richard K. Thomson
*Attorney, Agent, or Firm*—Karl F. Ross

[57] ABSTRACT

A conveyor for the nonforced displacement of a multiplicity of workpiece-supporting carriages along a transport path whereby the carriages can be selectively stopped and, after unloading, are returned to the starting end of the conveyor. Flanking this path there are provided upwardly-open upper channels and laterally open lower channels, each upper and lower channel on a respective side of the path receiving a roller conveyor chain so that rollers of the conveyor are supported upon the bottoms of each channel. The chain has central rollers which support the carriage along the upper stretch of the chain while the lateral rollers engage the bottom of the upper channel. On the return stretch, the central rollers support the chain on the lower channel while at least one of the lateral rollers supports the returning carriage through brackets which reach around the channels and form guides for laterally positioning the carriage with respect to both upper and lower channels. The space between the chains is free from cross bars or the like.

2 Claims, 4 Drawing Figures

14
3
13
20
18
5
15
3'
5'
15'
A
2
1
20
15
18
18'
15'
4
4'
13'

14
13
3
20
18
15
5
3'
5'
15'
A
2
1
20
15
18
18'
15'
4
4'
13'

11
11'
12
12'
5
5'
13
14
24
2
1
8
7
6
9
10
10'
9'

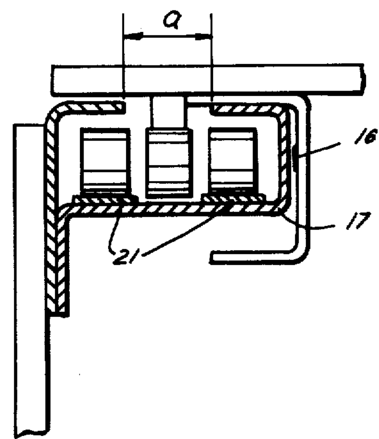
FIG. 3
FIG. 4
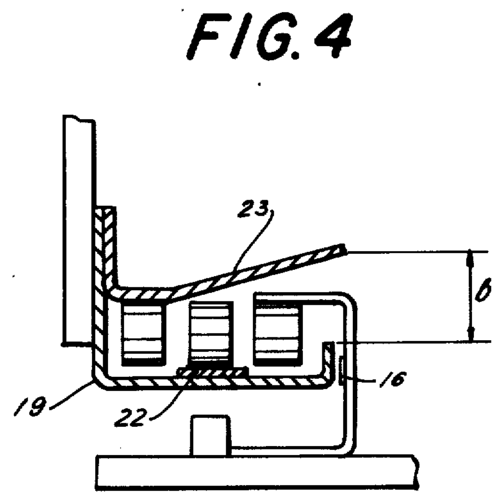

APPARATUS FOR CYCLELESS TRANSPORTATION

This invention relates to an apparatus for cycleless transportation, particularly to the design of a conveyor, for use in automatic production lines comprising freely connected metalworking machines, in which the machined workpieces are conveyed from one machine to another by means of carriages without a defined cycle.

Such transportation apparatus can include conveyors for the aforementioned purpose, in which the workpieces are conveyed without a defined cycle by means of carriages. The carriages move along the conveyor under the action of friction forces produced between the corresponding surfaces of the carriage and the rollers of an endless moving chain. Before each machine or checking station, any carriage can be stopped and fixed by means of a movable stop which is controlled by a manipulator feeding the machine. It is possible to form after the fixed carriage interoperational reserves of several such carriages (i.e. workpieces), which have been passed through by the preceding machine. At the end of the conveyor the machined workpieces are unloaded from the carriages, which return to the beginning of the conveyor over the bottom branch or stretch of the chain.

The drawbacks of this apparatus lie mainly in the design of the chain and the guiding of the empty carriages. The driving chain is composed of two parallel; transversely spaced roller chains, rigidly interconnected by a large number of transverse elements. When the chain is moving, these elements occupy the total area of the conveyor and do not permit protection of the chain. Moreover, across the width of the conveyor it is not possible to dispose different mechanisms, such as devices for lifting the workpieces for measuring, etc.

The bottom branch of such a chain is not guided over its entire length. During the return, the empty carriages hang on the chain, its bottom branch sags and the carriages overlap. This requires control of the number of the carriages passed through.

It is therefore a general object of the present invention to avoid the aforementioned, as well as other drawbacks of the known design. This is achieved by providing an apparatus for cycleless transportation, which comprises a carrying frame, in the inner portion of which there are fastened upper and bottom channels, in which there are disposed endless guiding roller chains, providing the cycleless transposrtation of the carriages.

For a better understanding of the invention, its operating advantages and its use, reference should be made to the accompanying drawings in which there is illustrated and described a preferred embodiment of the invention. In the drawing:

FIG. 3 is a cross-sectional view of the upper guiding channel; and

FIG. 4 is a cross-sectional view of the bottom guiding channel.

Figure 1:
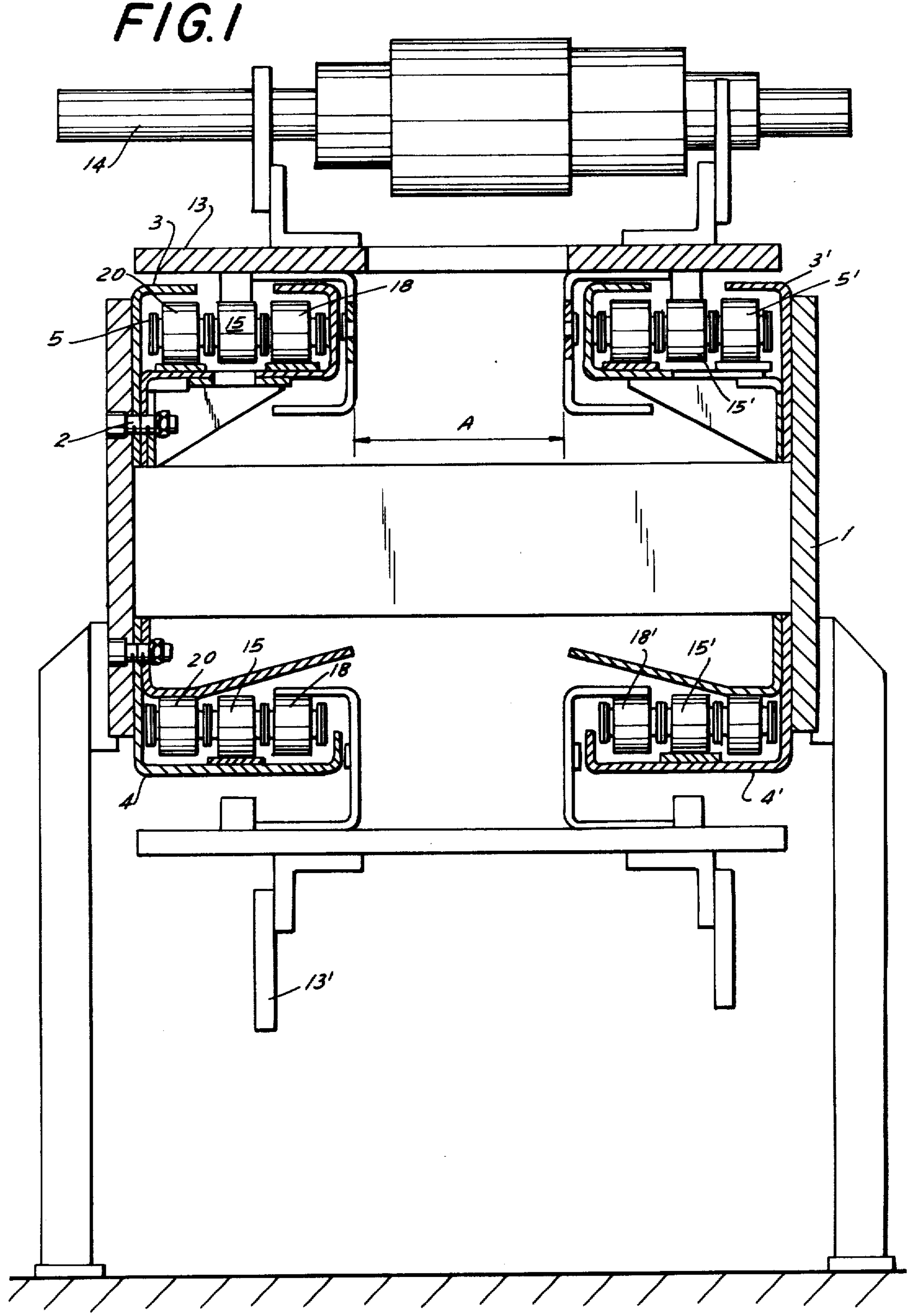
FIG. 1 is a cross-sectional view of the conveyor.
Figure 2:
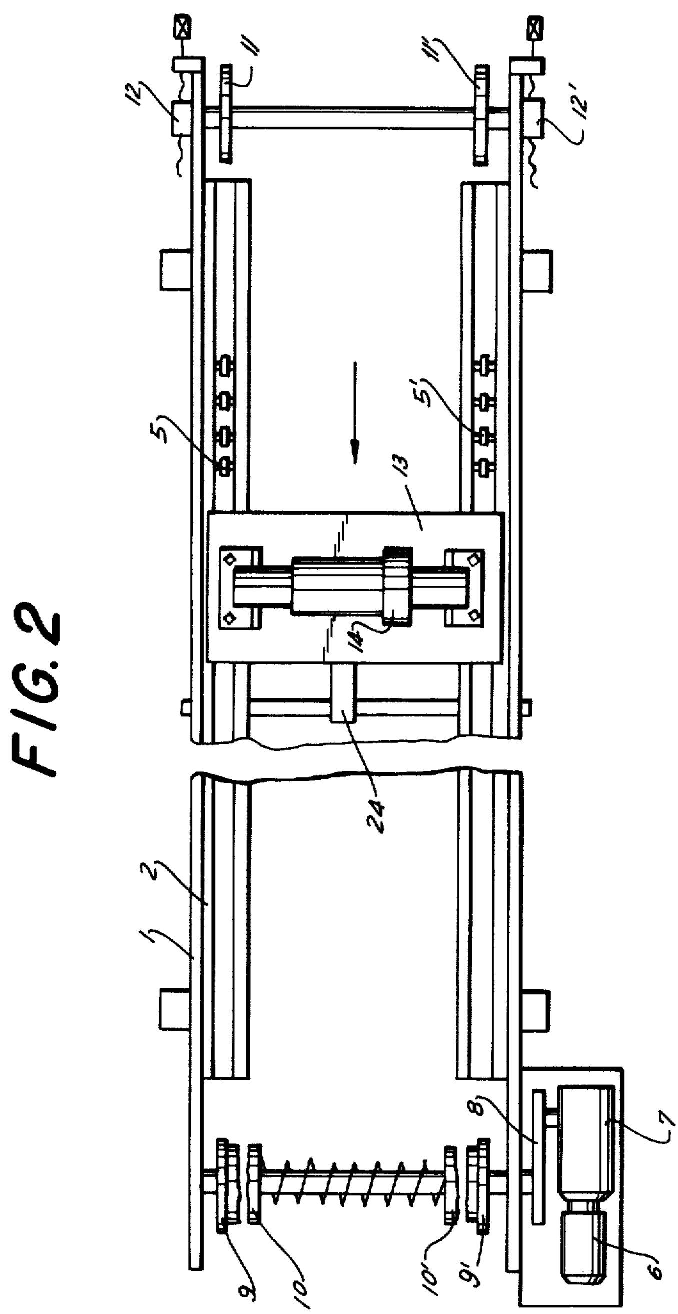
FIG. 2 is a top view of the conveyor.

The conveyor, as illustrated in FIGS. 1 and 2, comprises a base frame 1 with legs. To the frame, by means of bolts 2, there are fastened two upper guiding channels 3 and 3' and two bottom guiding channels 4 and 4'. In the left upper 3 and bottom 4 channels there is disposed the one driving endless chain 5, while in the right upper 3' and bottom 4' channels their is disposed the second chain 5'. Chains 5 and 5' are driven by motor 6, reduction gear 7, transmission 8 and chain (spockets) wheels 9 and 9' via the safety clutches 10 and 10'. Chain wheels 11 and 11' are not driven, but by means of mechanisms 12 and 12' the chains 5 and 5' can be tensioned individually within certain limits. The carriages 13 are shown in the upper side of the conveyor, and each of them can carry one workpiece 14 to be machined and they move in the direction indicated by the arrow in FIG. 2. The carriages 13 (FIG. 1) are without workpieces and move along the bottom side of the conveyor in the opposite direction. The carriages 13 lie upon rollers 15 and 15' of the chains 5 and 5' and are guided laterally by means of lugs 16 and the guiding rectangular sections 17 (FIG. 3) of channels 3 and 3'. The carriages 13' lie upon rollers 18 and 18' of chains 5 and 5' and are guided laterally by means of lugs 16 and the guiding rectangular sections (FIG. 4) of channels 4 and 4'.

The upper branch of chain 5, 5' lies by means of rollers 18 and 20 upon the supporting strips 21 of the upper channels 3, 3', which are welded along the entire length of the channel. The gap "*a*" (FIG. 3) of the upper channel is also provides along its entire length.

The bottom branch of chain 5, 5', lies by means of rollers 15, 15' upon the supporting strip 22 and the supporting section 23 of the bottom channels 4, 4' which are provided along its entire length. The gap "*b*" is provided along its entire length, too.

The principle of operation of the apparatus is as folows:

Chains 5 and 5' move continuously. Under the action of the forces of friction, the carriages 13 and 13' move in the aforementioned directions up to the moment of the actuation of the movable stop 24 by an outside signal. This movable stop 24 hinders the motion of the first carriage 13, 13', touching it, which in turn, engages with its side the next following carriage, stopping it, thus forming an interoperational reserve of workpieces. After removing the movable stop, the motion of the carriage continues.

The advantages of the apparatus of the present invention lie in that the channel A (FIG. 1) is free along the entire length of the conveyor from any movable conecting (fastening) elements, which makes it possible for providing in this space additional mechanisms, such as lifting devices for measuring the workpieces, etc.; the bottom branch of chains 5 and 5' is guided along its entire length in the channels 4 and 4', there is no sagging due to their own weight and the weight of the empty carriages 13', and this does not permit their overlapping and avoids accidental stoppings of the conveyor; chains 5 and 5' are totally covered, which from a point of view of work safety and reduced contamination is absolutely nessessary; by the use of two separate chains 5 and 5' it is possible to tension them individually; it is possible to provide safety clutches for each chain; the use of two safety clutches 10 and 10' provides an autonomy of both chains in the case of accidents.

The repair and maintenance of the separate chains are considerably facilitated.

What we claim is:

1. A conveyor, especially for the asynchronous transportation of workpieces along a transport path connecting a plurality of machines, said conveyor comprising:

a support frame extending along said path and having a pair of walls defining a gap between them;

a respective upwardly open upper channel and a respective laterally open lower channel fixed to each of said walls along the length of said path, each of said channels having a respective bottom;

respective endless roller chains guided in the upper and lower channels on each of said walls, each of said roller chains comprising an array of central rollers and respective arrays of lateral rollers flanking said central rollers, at least one of said arrays supporting the respective chain along an upper stretch thereof on the bottom of the respective upper channels, another array of said rollers supporting the respective chains on the bottoms of the respective lower channels;

a plurality of carriages spanning said gap and riding on the rollers of said other array along upper stretches of said chains while riding upon the rollers of said one of said arrays along a lower stretch of said chains, said carriages being entrained with said chains solely by friction whereby a stop engageable with a carriage on the upper stretch of said chains impedes further advance of the latter carriage while said chains are continuously displaced; and drive means on said support frame for driving said chains.

2. The conveyor defined in claim 1 wherein said drive means includes a drive motor, reduction gearing connected to said drive motor, respective sprocket wheels engaging each of said chains, and respective safety clutches operatively connecting each of said sprocket wheels with said reduction gearing;

each of said bottoms is provided with respective supporting strips rollingly engageable by respective arrays of rollers;

said gap is free from transverse elements bridging said chains; and each of said carriages includes a pair of outwardly open rectangular sections embracing said channels and laterally guiding the respective carriage therealong, said sections having flanges reaching laterally into said lower channels for supporting the respective carriage upon the respective said one of said arrays of rollers of the respective chain.

* * * * *